(12) United States Patent
Fluegge et al.

(10) Patent No.: US 7,447,611 B2
(45) Date of Patent: Nov. 4, 2008

(54) POWER GENERATION PERFORMANCE ANALYSIS SYSTEM AND METHOD

(75) Inventors: Ronald M. Fluegge, The Colony, TX (US); Richard B. Jones, The Woodlands, TX (US)

(73) Assignee: HSB Solomon Associates, LLC, Dallas, TX (US)

( * ) Notice: Subject to any disclaimer, the term of this patent is extended or adjusted under 35 U.S.C. 154(b) by 0 days.

(21) Appl. No.: 11/801,221

(22) Filed: May 9, 2007

(65) Prior Publication Data

US 2007/0265804 A1 Nov. 15, 2007

Related U.S. Application Data

(60) Provisional application No. 60/798,924, filed on May 9, 2006.

(51) Int. Cl.
G06F 19/00 (2006.01)
(52) U.S. Cl. ........................................ 702/182; 702/183
(58) Field of Classification Search ................ 702/182, 702/183
See application file for complete search history.

(56) References Cited

U.S. PATENT DOCUMENTS

| | | | |
|---|---|---|---|
| 6,085,216 A * | 7/2000 | Huberman et al. | 718/104 |
| 6,988,092 B1 | 1/2006 | Tang et al. | |
| 7,039,654 B1 * | 5/2006 | Eder | 707/104.1 |
| 7,233,910 B2 | 6/2007 | Hileman et al. | |
| 2005/0187848 A1 * | 8/2005 | Bonissone et al. | 705/36 |
| 2006/0247798 A1 | 11/2006 | Subbu et al. | |
| 2006/0271210 A1 | 11/2006 | Subbu et al. | |

OTHER PUBLICATIONS

Gang, L;Fushuan, W; Xueshun, Z; Chung, C;Wong, K;"Balance Programming Between Target and Chance With Application in Building OptimalBidding Strategies for Generation Companies"International Conference on Intelligent Systems Applications To Power Systems; Nov. 5-8, 2007; pp. 1-6.*

Cipolla, R; Astrom, K; Giblin, P;"Motion From the Frontier of Curved Surfaces";5th International Conference On Computer Vision;Jun. 20-23, 1995; pp. 269-275.*

Michael Curley and Robert Richwine, "Benchmarking Seminar," North American Electric Reliability Council, San Diego, California (Oct. 20, 2006).

"Predicting Unit Availability: Top-Down Analyses for Predicting Electric Generating Unit Availability," Predicted Unit Availability Task Force, North American Electric Council, United States of America (Jun. 1991).

(Continued)

*Primary Examiner*—Edward R Cosimano
*Assistant Examiner*—Douglas N Washburn
(74) *Attorney, Agent, or Firm*—Ronald Flugge; Richard Jones; Akin Gump Strauss Hauer & Feld LLP

(57) ABSTRACT

A system and method is described herein that includes a software-based functionality to assess the relationship between reliability, operational, maintenance and plant betterment activities and to determine the frontier of efficient spending and other measures of performance to achieve a level of reliability that is based on data from units of similar design and performance.

10 Claims, 3 Drawing Sheets

OTHER PUBLICATIONS

Robert R. Richwine, "Using Reliability Data in Power Plant Performance Improvement Programs," ASME Power Division Conference Workshop, San Antonio, Texas (Jul. 16, 2007).

"Developing Economic Performance System to Enhance Nuclear Power Plant Competitiveness," International Atomic Energy Agency, Technical Report Series No. 406, Vienna, Austria (Feb. 2002).

"Performance of Generating Plant: New Realities, New Needs," World Energy Council, London, United Kingdom (Aug. 2004).

Robert R. Richwine, "Optimum Economic Performance: Reducing Costs and Improving Performance of Nuclear Power Plants," Rocky Mountain Electrical League, AIP-29, Keystone Colorado (Sep. 13-15 1998).

Robert R. Richwine, "Maximizing Availability May Not Optimize Plant Economics," World Energy Council, Performance of Generating Plant Committee - Case Study of the Month Oct. 2004, London, United Kingdom (Oct. 2004).

Robert R. Richwine, "Optimum Economic Availability," World Energy Council, Performance of Generating Plant Committee - Case Study of the Month Jul. 2002, London, United Kingdom (Jul. 2002).

Robert Richwine, Setting Optimum Economic Performance Goals to Meet the Challenges of a Competitive Business Environment, Rocky Mountain Electrical League, Keystone, Colorado (Sep. 13-15, 1998).

* cited by examiner

POWER GENERATION PERFORMANCE ANALYSIS SYSTEM AND METHOD

BACKGROUND OF THE INVENTION

1. Field of the Invention

The invention relates to a system and method for comparative operational performance analysis of one or more electrical power generating units using computer software, computer hardware, graphical presentation of results and statistical frontier analysis.

2. Background Summary

Negative competition in the electric generating industry requires that power generating units perform in the most cost-effective manner consistent with their intended use. This means achieving strategic levels of realistic reliability and expenditures on a consistent basis. The cost-effective element of this relationship is the hardest to achieve. To be effective, a generating unit's reliability goals and expenditures must be matched with competitive expectations. Defining what constitutes competitive goals requires critical assessments and comparisons, which can best be done using statistical benchmarking techniques.

BRIEF SUMMARY OF THE INVENTION

What are the costs to maintain an "available" or "reliable" kilowatt, and what are the correct, feasible and optimal targets to be set for each of the target units in this regard (i.e., cost efficiency)? The result is not a single point answer or a relationship that directly equates a given reliability level with a given expenditure. Rather, the result is a range of achievable reliability objectives and expenditure patterns containing the information needed to support unit-specific strategies. By way of example, applying the results of this methodology maybe dependent upon the design characteristics, operating objectives as well as maintenance and plant betterment activities established for each generating unit.

Embodiments of the present invention provide a hardware and software tool, which overcome drawbacks of existing systems by providing a system and methodology for predicting a generating unit's future reliability and cost that enables dynamic analyses. The predictive system and methodology of this embodiment is based on an evaluation of the relationship of unit reliability with key parameters, such as unit design characteristics, operational factors, maintenance, and plant betterment activities.

BRIEF DESCRIPTION OF THE DRAWINGS

A better understanding of the present invention can be obtained when the following detailed description of the preferred embodiment is considered in conjunction with the following drawings, in which.

Figure 1:
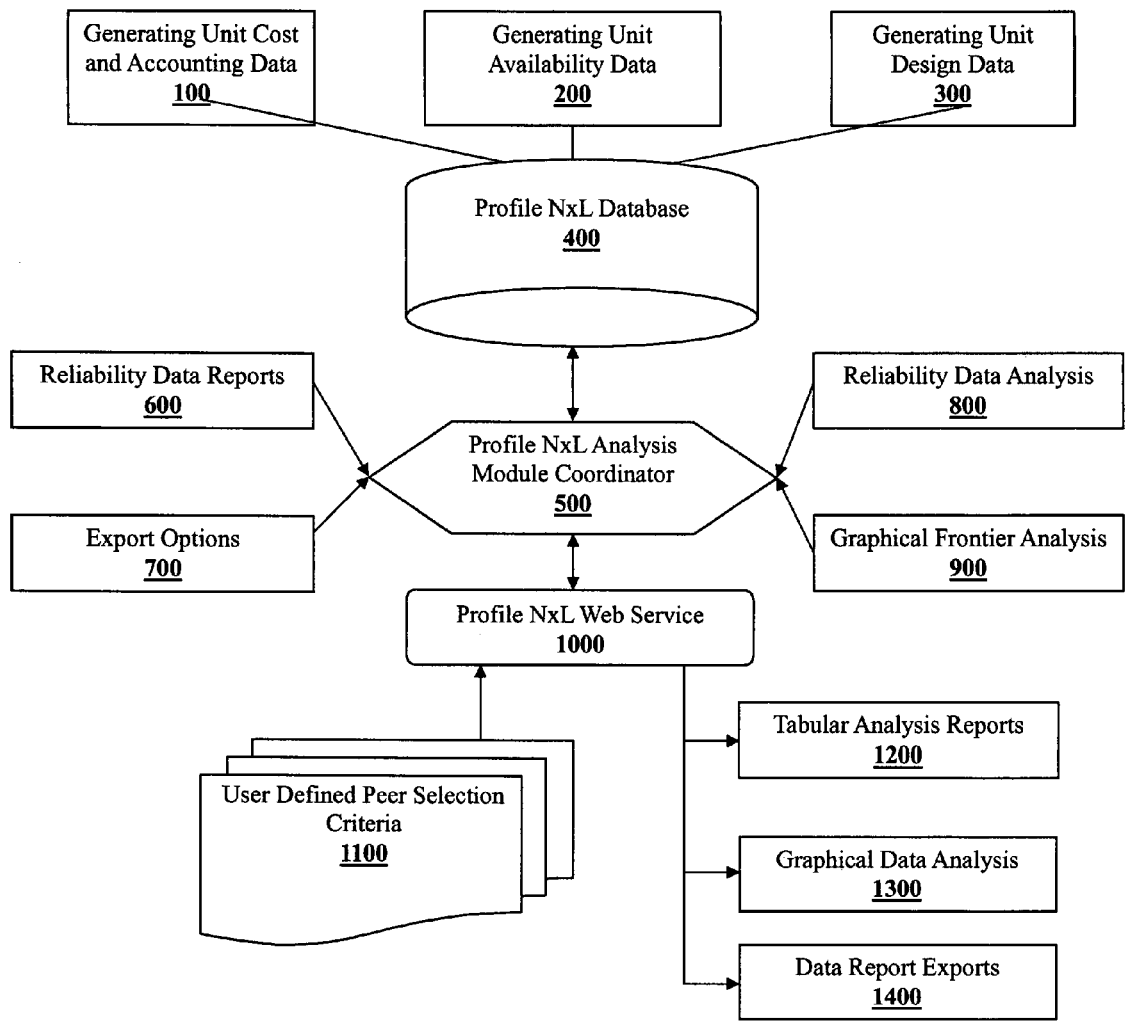
FIG. 1 is a block diagram of components for the claimed product, system and method.

An embodiment of the present invention includes a method for providing dynamic comparative operational performance analyses of reliability, operational, maintenance and plant betterment activities comprising the steps of: providing a dataset of user-selected data corresponding to a plurality of reference power generating units, the user-selected data comprising a plurality of variables; computing a complete frontier curve for a user-selected dataset corresponding to at least one of the plurality of variables; and comparing data corresponding to a target unit to a portion of the complete frontier curve.

One embodiment of the present invention includes a method for providing dynamic comparative operational performance analyses of reliability, operational, maintenance and plant betterment activities comprising the steps of: providing a dataset of user-selected data corresponding to a plurality of reference power generating units, the user-selected data comprising a plurality of variables; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; determining maximum and minimum values of variables in the dataset for frontier curves; applying a statistical filter to the data from the dataset for each of the plurality of hemispheres and quadrants, generating a filtered data; combining the filtered data into frontier data groups based on user inputs; computing maxima and minima for complete frontier curves based on the frontier data groups; optimizing data envelopment of the complete frontier curves based on the geometric center; computing complete frontier curve base data values; converting the complete frontier curve based on the geometric center of the dataset; displaying a user-selected portion of the complete frontier curve; and comparing a target unit's data with the user-selected portion of the complete frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to reference power generating units; and a computer program stored by the first storage subsystem, when executed causing the processor to: select a dataset from the plurality of data corresponding to a user selection; determine a complete frontier curve based on the dataset; and compare data of a target unit with a portion of the complete frontier curve.

Yet another embodiment of the present invention includes a system comprising: a first server, comprising: a processor, and a first storage subsystem; a second server, comprising: a second storage subsystem; a database stored by the second storage subsystem comprising: a plurality of data corresponding to reference power generating units; and a computer program stored by the first storage subsystem, when executed causing the processor to: select a dataset from the plurality of data corresponding to a user selection; determine a complete frontier curve based on the dataset; and compare data of a target unit with a portion of the complete frontier curve.

Several determinations are based on the geometric center, instead of direct calculation, since the method includes the filtering of data points, and, as necessary, data points may be eliminated from a calculation if it is determined that the data points would lead to a frontier curve that did not accurately reflect the data as a whole.

DETAILED DESCRIPTION OF EMBODIMENTS OF THE INVENTION

As shown in FIG. 1, the Power Generation Performance Analysis System and Method according to one embodiment of the present invention is shown. Operational and cost data for generating units, where the design characteristics are known at a level of granularity consistent with the analysis goals, serve as the basic input for this invention. Cost data 100 generally includes monies for operations, fuel, maintenance, and capital improvements. The data is consistent with the level of detail available in the reliability data (e.g., components, subsystems, systems and unit) and with the granularity of the reported reliability data (i.e., monthly).

The operational availability data 200 is composed of event and performance information. The event database is a detailed summary of the outage and derating events each unit had during any given period. Summarized on a monthly basis, the performance database includes capacity ratings, generation, loading modes, availability and unavailability hours, and fuel quality information for each unit.

The Generating Unit Design 300 database in this embodiment consists of details on the design parameters and installed equipment on each unit.

The integrated data is stored in a database 400. This database 400 in this embodiment serves as the primary data source for all calculations and analysis. It is accessed by an analysis controller 500 that coordinates what specific calculations are requested by a user in this embodiment.

The analysis modules in this embodiment include reliability data analysis reports 600 which list the desired reliability metrics in a user-specified format.

The export options module 700 enables users to transfer data and reports from this system to other user-specified systems for extended analyses in this embodiment.

The reliability data analysis module 800 computes user-specific summary metrics and indices including but not limited to monthly, period average, or period total unitized cost data ($ per kW or per MWh) and reliability measures for the peer-unit group that includes the target unit(s) only, the peer-unit group including the target unit(s), or the peer-unit group excluding the target unit(s).

The Graphical Frontier Analysis Module 900 enables users to review various strategies assists the decision-making process in setting realistic unit performance targets based on data from actual achieved performance by units in the comparison analysis as selected by the user.

Figure 2:
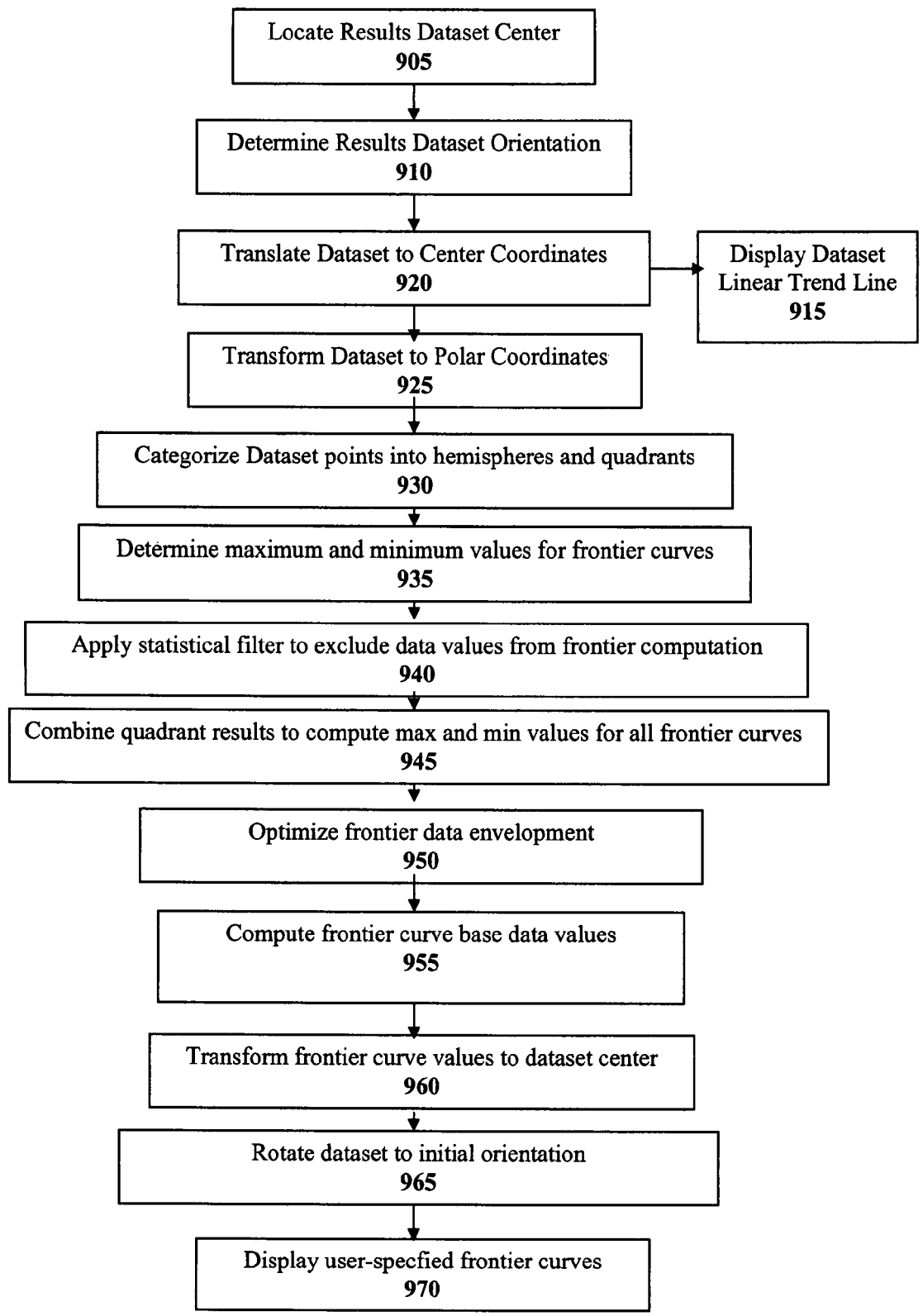
FIG. 2 is a flowchart of an embodiment of the claimed product, system and method.

As shown in FIG. 2, a pre-selected dataset, called the results dataset, is used and its geometric center is determined in step 905. The conversion of the results dataset from its initial orientation, as determined in step 905, to polar coordinates takes place in step 920 and step 925. The use of polar coordinates is illustrative and exemplary only. The orientation of the results dataset is analyzed in step 910 and transformations are applied in step 920 and a linear trend is displayed in step 915. The results dataset is further transformed to polar coordinates in 925 and data values are categorized into hemispheres and quadrants in step 930. The methodology does not arbitrarily eliminate any generating unit that might have experienced an abnormal occurrence (data outlier); this might, in itself, bias the results. As an example, a generating unit's Equivalent Forced Outage Rate (EFOR) or expenditure pattern may be extremely high or low for one of the study periods and more reasonable at others. Excluding this high/low period would bias the analysis. Graphical data analysis allows the user to be aware of these extremes and subjective interpretations of these graphs could easily consider them. The resultant dataset's maxima and minima are computed in step 935, which provides maximum and minimum values for frontier curves. A statistical filter is applied in step 940 to determine which data values will be used in the frontier calculation. Based on user-specified inputs, the data is combined into frontier groups and new maxima and minima are calculated for composite frontier curves in step 945. The complete frontier curve is composed of the individual frontier curves (i.e. left hemisphere, right hemisphere, top hemisphere, bottom hemisphere, upper right quadrant, lower right quadrant, upper left quadrant, lower left quadrant) for a variable. These complete frontier curves are further refined to contain the maximum data envelopment in step 950. The frontier data groups are used to compute nonlinear complete frontier curves in step 955. The complete frontier curves are converted back to their original orientation in step 960 and step 965. The complete frontier curves are then transformed to the results dataset center in step 960, re-rotated to initial orientation in step 965, and displayed in graphical format superimposed on the detailed results dataset plot in step 970. The order of the foregoing steps in this embodiment is illustrative and exemplary, and the method may be practiced with the steps in a different order.

The interface between users world-wide is managed by the Profile N×L web service in 1000. This interface performs functions related to data security and information management between the database and the family of independent users.

User selected target units to be benchmarked 1100 and the peer-unit group that has similar design characteristics and operational parameters of the target unit to the experience data contained in the database 400 are compared.

Users may select the report format and structure for which would like to view certain results 1200.

Figure 3:
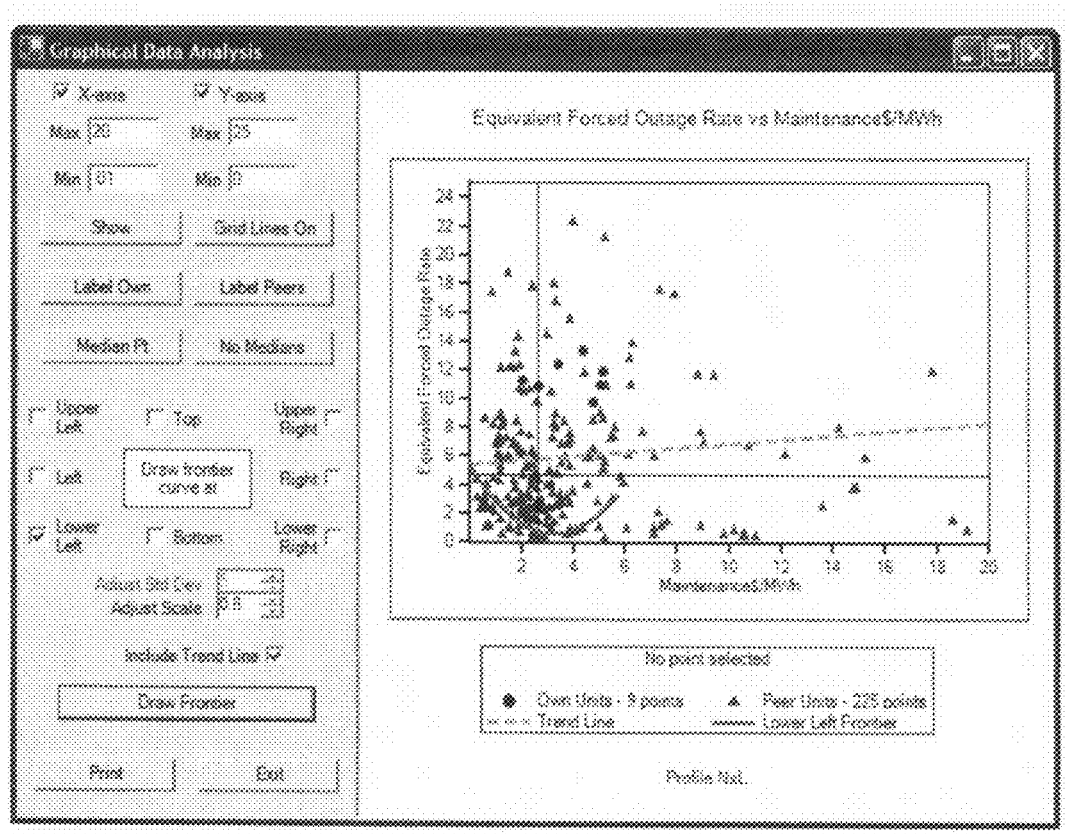
FIG. 3 is a screen shot of an embodiment of the claimed product, system and method.

The graphical output 1300 is shown in FIG. 3. It is a dynamic framework that enables users to continuously select new result sets and re-analyze and re-compare their units' performance. This integrated statistical graphical presentations is a part of the invention that enables users to re-select and thereby refine, their results set to more precisely define their performance peer group In one embodiment of the invention, the user can extract either monthly, period average, or period total unitized cost data ($ per kW or per MWh) and reliability measures for the peer-unit group that includes the target unit(s) only, the peer-unit group including the target unit(s), or the peer-unit group excluding the target unit(s). After tabulation and analysis of the resultant reliability and cost data, the user may prepare graphs showing unitized costs versus an appropriate reliability measure. The user may draw median lines for the unitized costs and reliability measure values to establish four distinct quadrants as shown in FIG. 3. The methodology in this example includes two statistical-based views of the data: (1) using the quadrant diagram, determining the trend line for the data to determine the change in the reliability measure per incremental change in unitized cost, and (2) using the quadrant diagram, performing the Frontier Analysis for the appropriate section of the data (i.e., the "best-performance" quadrant or side of the dataset) where the sections are identified as: quadrant (upper-right, upper-left, lower-right, and lower-left) or side (top, bottom, left, and right). The graphical analysis technique included in this invention in one embodiment, allows the analysis of monthly, period average, and period total values using quadrants. In this embodiment, quadrants are formed when, a horizontal line is drawn at the median of the y-axis value and a vertical line is drawn at the median of the x-axis value. The resulting "cross-hair" pattern allows the units to be divided into quadrants as in FIG. 3. Each quadrant can be seen to represent different operating and expenditure strategies. This use of medians for each axis and quadrants is illustrative and exemplary only and other lines may be used. For example, several lines may be used to on each axis to create a grid separating data points into highly specific groups. Changes in spending and operating strategies could be observed using multi-year rolling averages by reviewing graphs for several successive multi-year periods.

In FIG. 3, the quadrants created in the embodiment provide an indicator to the user of the performance of the target units compared with the dataset of units overall. In this embodiment, units with below median maintenance/$MWH and below median EFOR appear in the lower left quadrant. Units performing above the median in maintenance/$MWH and EFOR appear in the upper right quadrant. In this embodiment, a least squares fit is provided for all of the units and displayed as a dashed line. In this embodiment, frontier curves may be selected for viewing. Each frontier curve is calculated to envelope an optimal portion of the dataset while excluding extreme values (outliers). The decision of whether a point is an outlier is based on a statistical determination. In this embodiment, frontier curves may be displayed for any quadrant or to either side of either of the median lines. This display is illustrative and exemplary only.

The methodology shows that the benchmarking analysis varies with the inherent design and historical operating characteristics associated with the target unit(s). It also shows that operations and maintenance costs and plant betterment activities vary and are dependent on the strategies assigned to each generating unit. It demonstrates that given nearly any set of circumstances, changes can be made affecting generating unit reliability, costs, or both. In effect, by applying the methodology and making informed decisions, plant generation managers can set realistic, data-based performance targets.

The methodology simultaneously considers the impact of design and operational variables on the performance of an electric generating unit. The design characteristics and operational factors of the target unit(s) are the focus of this methodology. This results in the identification of a statistically valid group of units that have similar traits. Within the peer unit grouping, the units are not all the same, but they are not different enough to be different.

There are many viewpoints on which design characteristics and operation variables impact generating units. This methodology allows the user to use their own knowledge of which variables impact reliability. The benchmarking list includes two types of variables: class and continuous. Class-types include variables such as: criticality (supercritical versus subcritical), balanced versus pressurized furnace draft, number of reheats, etc. These are yes/no-type variables. Examples of continuous-type variables include: unit capacity ratings (generally between 1 and 1,200 MWe), reserve shutdown hours (generally between 0 and 8,784 hours), and unit age or vintage period based on year of installation. These are range-type variables.

The dynamic nature of this invention allows users to identify key factors influencing performance. The procedure can be applied to general unit types or tailored to a specific generating unit. The result is a more focused peer unit group against which comparisons can be made.

Users can select specific reporting metrics and analysis indices to be included in the data reports either for used within this invention or for exporting 1400 to other software for additional analyses.

The foregoing disclosure and description of various embodiments of the invention are illustrative and explanatory thereof, and various changes in the details of the illustrated system and method may be made without departing from the scope of the invention.

We claim:

1. A method for providing dynamic comparative operational performance analyses comprising the steps of:
    providing a dataset of user-selected data corresponding to a plurality of reference power generating units, the user-selected data comprising a plurality of variables;
    determining a geometric center of the dataset;
    determining an orientation for the dataset based on the geometric center;
    converting the dataset to a predetermined coordinate system based on the geometric center;
    categorizing data from the dataset into a plurality of hemispheres and quadrants based on the geometric center;
    determining maximum and minimum values of variables in the dataset for frontier curves;
    applying a statistical filter to the data from the dataset for each of the plurality of hemispheres and quadrants, generating a filtered data;
    combining the filtered data into frontier data groups based on user inputs;
    computing maxima and minima for complete frontier curves based on the frontier data groups;
    optimizing data envelopment of the complete frontier curves based on the geometric center;
    computing complete frontier curve base data values;
    converting the complete frontier curve based on the geometric center of the dataset;
    displaying a user-selected portion of the complete frontier curve; and
    comparing a target unit's data with the user-selected portion of the complete frontier curve.

2. The method of claim 1, wherein the plurality of variables comprises one or more of unit design characteristics, operations factors, and maintenance and plant betterment data, or combinations thereof.

3. The method of claim 1, wherein the target unit is a reference generating unit.

4. The method of claim 1 comprising the additional step of:
    displaying a linear trend of the dataset.

5. A system comprising:
    a server, comprising:
        a processor, and
        a storage subsystem;
    a database stored by the storage subsystem comprising:
        a plurality of data corresponding to reference power generating units; and
    a computer program stored by the storage subsystem, when executed causing the processor to:
        select a dataset from the plurality of data corresponding to user selection criteria;
        determine a complete frontier curve based on the dataset; and
        compare data of a target unit with a portion of the complete frontier curve.

6. The system of claim 5, wherein the computer program, when executed further causes the processor to display a linear trend of the dataset.

7. The system of claim 5, wherein the target unit is a reference generating unit.

8. A system comprising:
    a first server, comprising:
        a processor, and
        a first storage subsystem;
    a second server, comprising:
        a second storage subsystem;
    a database stored by the second storage subsystem comprising:
        a plurality of data corresponding to reference power generating units; and
    a computer program stored by the first storage subsystem, when executed causing the processor to:

select a dataset from the plurality of data corresponding to a user selection;

determine a complete frontier curve based on the dataset; and compare data of a target unit with a portion of the complete frontier curve.

9. The system of claim 8, wherein the computer program, when executed further causes the processor to display a linear trend of the dataset.

10. The system of claim 8, wherein the target unit is a reference generating unit.

* * * * *